US008594497B2

(12) United States Patent
Underwood et al.

(10) Patent No.: US 8,594,497 B2
(45) Date of Patent: *Nov. 26, 2013

(54) MULTI-INTERFACE PROTOCOL ANALYSIS SYSTEM

(75) Inventors: Rosa M. Underwood, Washington, DC (US); Henry A. McKelvey, Capital Heights, MD (US); Umang A. Patel, Bellerose, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

This patent is subject to a terminal disclaimer.

(21) Appl. No.: 12/977,287

(22) Filed: Dec. 23, 2010

(65) Prior Publication Data
US 2011/0091205 A1    Apr. 21, 2011

Related U.S. Application Data

(63) Continuation of application No. 11/863,854, filed on Sep. 28, 2007, now Pat. No. 7,899,323.

(51) Int. Cl.
*H04B 10/08* (2006.01)
*H04B 17/00* (2006.01)

(52) U.S. Cl.
USPC ........ 398/25; 398/9; 398/10; 398/16; 398/17; 398/36; 398/58; 398/66; 398/154; 398/164; 398/168; 370/241; 370/431; 370/464

(58) Field of Classification Search
USPC ............... 398/9, 17, 25, 36, 57–73, 154, 164, 398/168; 370/353–498
See application file for complete search history.

(56) References Cited

U.S. PATENT DOCUMENTS

| 6,362,908 B1 | 3/2002 | Kimbrough et al. |
| 7,002,995 B2 | 2/2006 | Chow et al. |
| 7,039,041 B2 | 5/2006 | Robohm et al. |
| 7,899,323 B2 * | 3/2011 | Underwood et al. ........... 398/25 |
| 2003/0137975 A1 | 7/2003 | Song et al. |
| 2006/0013247 A1 | 1/2006 | Koch et al. |
| 2006/0013260 A1 | 1/2006 | Oron |
| 2006/0136715 A1 * | 6/2006 | Han et al. ...................... 713/151 |
| 2006/0256811 A1 | 11/2006 | Saito et al. |
| 2006/0256813 A1 | 11/2006 | Brusca et al. |
| 2007/0110441 A1 * | 5/2007 | Saito et al. ...................... 398/71 |
| 2007/0133576 A1 | 6/2007 | Tsuge et al. |
| 2008/0037579 A1 | 2/2008 | Lee et al. |
| 2008/0056302 A1 * | 3/2008 | Erdal et al. ..................... 370/474 |
| 2008/0279554 A1 * | 11/2008 | Kazawa et al. ................. 398/69 |
| 2009/0016713 A1 * | 1/2009 | Liu et al. ........................ 398/17 |

* cited by examiner

*Primary Examiner* — Li Liu (57) ABSTRACT

A device may include a first module to capture information relating to network traffic passing through a first interface in a network device. A second module may capture information relating to network traffic passing through a second interface in the network device. A control module may be configured to transmit control commands to the first module and the second module, the control commands instructing the first module and the second module to capture information relating to network traffic passing through the first interface and the second interface, respectively. The control module may be further configured to receive the captured information from the first module and the second module, correlate the received information from the first module and the second module; and provide the correlated information to a user.

17 Claims, 5 Drawing Sheets

MULTI-INTERFACE PROTOCOL ANALYSIS SYSTEM

CROSS-REFERENCE TO RELATED APPLICATION

This application is a continuation of U.S. patent application Ser. No. 11/863,854 filed Sep. 28, 2007, the entirety of which is hereby incorporated by reference herein.

BACKGROUND INFORMATION

Assuring high performance in today's data networks is of utmost importance. Accordingly, modern networks may be subjected to a variety of testing scenarios to both identify problems and maximize network potential. In testing for network functionality, conventional testing may include placement of single circuit protocol analyzers within the network to provide data relating to traffic passing through the analyzer. Unfortunately, known protocol analyzers must be set up individually and can only analyze one circuit at a time, thereby complicating testing due to the ambiguity of where to place the units and what data would need to be captured and when the data would need to be captured.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein provide for enhanced network testing by facilitating the monitoring and correlation of network information from a number of interface points. In one embodiment, interface modules associated with an optical line termination (OLT) unit may capture network information as it passes through each module. The network information may be collected and forwarded to a protocol analyzer for correlation and subsequent analysis.

Figure 1:
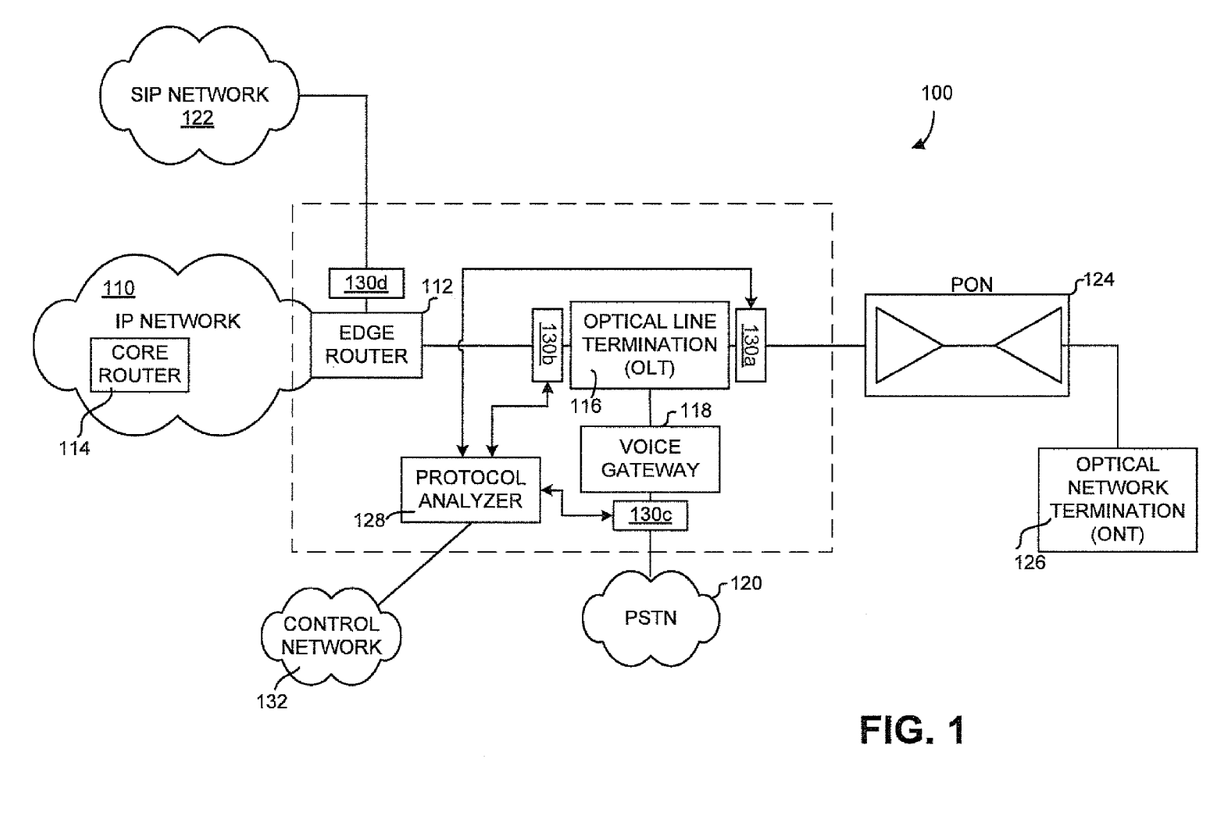
FIG. 1 is a diagram of an exemplary system in which embodiments described herein may be implemented.

FIG. 1 is a diagram of an exemplary system in which embodiments described herein may be implemented. As illustrated, system 100 may include a first network 110, edge router 112, core router 114, OLT unit 116, voice gateway 118, public switched telephone network (PSTN) 120, session initiation protocol (SIP) network 122, passive optical network (PON) 124, optical network termination (ONT) unit 126, protocol analyzer 128, network modules 130a, 130b, 130c, and 130d, and control network 132.

First network 110 may include a Local Area Network (LAN), a wide area network (WAN), such as a cellular network, a satellite network, or the Internet, a private WAN, or a combination of the Internet and a private WAN, that is used to transport data. First network 110 may include a number of network devices. As is particularly shown in FIG. 1, first network 110 may include a number of routers or other switching devices that transmit electrical data units, such as data packets, through first network 110. For example, first network 110 may include edge router 112 and core router 114.

Edge router 112 may generally function to connect devices, such as OLT unit 116, voice gateway 118, and ONT unit 126, to first network 110. Core router 114 may generally function to transmit data between other routers within first network 110. In addition to simply routing data, edge router 112 and core router 114 may support other "value added" functions, such as quality of service (QoS) features, specialized security functions, such as IPsec (IP security) encryption, access control, statistics relating to multicast transmissions, or accounting features.

Voice gateway 118 may include any device capable of connecting first network 110 or OLT unit 116 to PSTN 120. Additionally, voice gateway 118 may include hardware and/or software for converting data from a PSTN format to a format compatible with first network 110 (e.g., Ethernet, Gigabit Ethernet, 10 Gigabit Ethernet, ATM (asynchronous transfer mode), MPLS (multi-protocol label switching), etc.) or OLT unit 116 (e.g., SONET (synchronous optical network)). Similarly, voice gateway 118 may include hardware and/or software for converting data from a format compatible with first network 110 or OLT unit 116 to a format useable by PSTN 120. For example, voice gateway 118 may convert voice calls between a packet data format compatible with first network 110 and a circuit-switched format compatible with PSTN 120.

PSTN 120 may include any network capable of carrying plain old telephone system (POTS) compatible data. For example, PSTN 120 may include a circuit-switched network that may be implemented via fixed-line analog connections or digital connections. PSTN 120 may include central offices and/or switches for carrying data over twisted pair copper conductors and/or optical fibers.

SIP network 122 may include any network capable of carrying or facilitating session initiation protocol communications. For example, SIP network 122 may include SIP devices and proxy servers for supporting SIP communications.

A network service provider, such as for example, a telecommunications company providing network connectivity to a subscriber at ONT unit 126, may provide connectivity between first network 110, PSTN 120, and SIP network 122 through optical connections. As shown in FIG. 1, for example, the optical connections may be provided by OLT unit 116 and PON 124. OLT unit 116 may include hardware and/or software for providing an interface between PON 124 and the backbone network (e.g., first network 110, voice gateway 118, PSTN 120, and SIP network 122). OLT unit 116 may, for instance, be responsible for allocating bandwidth to subscribers and may provide time division multiplexed (TDM) interfaces such as SONET/SDH or PDH with PON 124. In general, OLT unit 116 may receive data from edge router 112 or voice gateway 118 and may provide the data to a subscriber of PON 124 at ONT unit 126 via TDM techniques.

PON 124 may include one or more strands of optical fiber and splitters for the optical fiber. The optical fibers that make up PON 124 may be physically distributed to a number of subscribers. For example, PON 124 may implement a fiber to the premises (FTTP) network in which a number of subscribers are provided with network connectivity by a length of optical fiber that runs from OLT unit 116 to the premises of the subscribers. The FTTP network may be used to provide, for example, one or both of telephone and broadband services (i.e., Internet connection, television, etc.) to the subscribers. PON 124 may include a high-speed fiber optic network, such as Verizon's FiOS™ network. It should be understood that the general term PON may be interpreted to include multiple variations including Broadband PON (BPON), Gigabit PON (GPON), 10 Gigabit Ethernet PON (10 GE-PON), etc.

ONT 126 may provide the termination points for a fiber line that terminates at the premise of a subscriber. ONT 126 may provide an interface between the fiber optic line and one or more wired or wireless networks within the subscriber's premises. ONT 126 may thus operate to terminate PON 124 and present native service interfaces to the subscribers. These services can include voice (e.g., plain old telephone service (POTS), voice over IP (VoIP) (e.g., session initiation protocol or H.248), etc.), data (e.g., Ethernet, V.35, etc.), video, and/or telemetry.

Consistent with aspects described herein, network modules 130a, 130b, 130c, and 130d (collectively, "network modules 130") may be configured to capture network data at a number of locations or interfaces within system 100 and relay or transmit the data to protocol analyzer 128. As will be discussed in detail below, each network module 130 may be configured to convert an optical data stream presented at its interface to a corresponding electrical signal. The data included in the electrical signal may be captured and forwarded to protocol analyzer 128. The captured data may be time-stamped, tagged, and stored in a database or other memory structure (not shown) for subsequent review and analysis. In one implementation, network modules 130 may be provided as cards in a multicard chassis, such that each module is commonly located, configured, and controlled.

Each network module 130 may be configured according to the interface with which it is associated. For example, network module 130a may be located at the interface between PON 124 and OLT 116 and may be configured to process data presented at this interface. Network module 130b may be located at the interface between OLT 116 and edge router 112 and may be configured to convert the optical stream at that interface to ATM cells. Network modules 130c and 130d may be located at the interface between PSTN 120 and voice gateway 118 and the interface between edge router 112 and SIP network 122, respectively. Network modules 130c and 130d may be configured to convert the optical stream at these interfaces to Ethernet frames prior to data capture. It should be noted that, for each interface, network modules 130 may be configured to extract electric signals and/or data units corresponding to the interface. Additionally, higher level processing may be performed to convert the extracted data into other formats prior to capture. For example, a network module located at an ATM interface, such as the interface between OLT 116 and edge router 112, may be configured to extract ATM cells from an optical signal and convert the ATM cells into Ethernet frames.

Control network 132 may include any network capable of carrying or facilitating transmission of control information to network modules 130a-130d. For example, control network 132 may be an out-band network using a secure and dedicated network. Additionally, control network 132 may be configured to carry certain types of data, such as SNMP (simple network management protocol) messages, that support network control or management operations.

The exemplary configuration illustrated in FIG. 1 is provided for simplicity. It should be understood that a typical system may include more or fewer devices than illustrated in FIG. 1.

Figure 2:
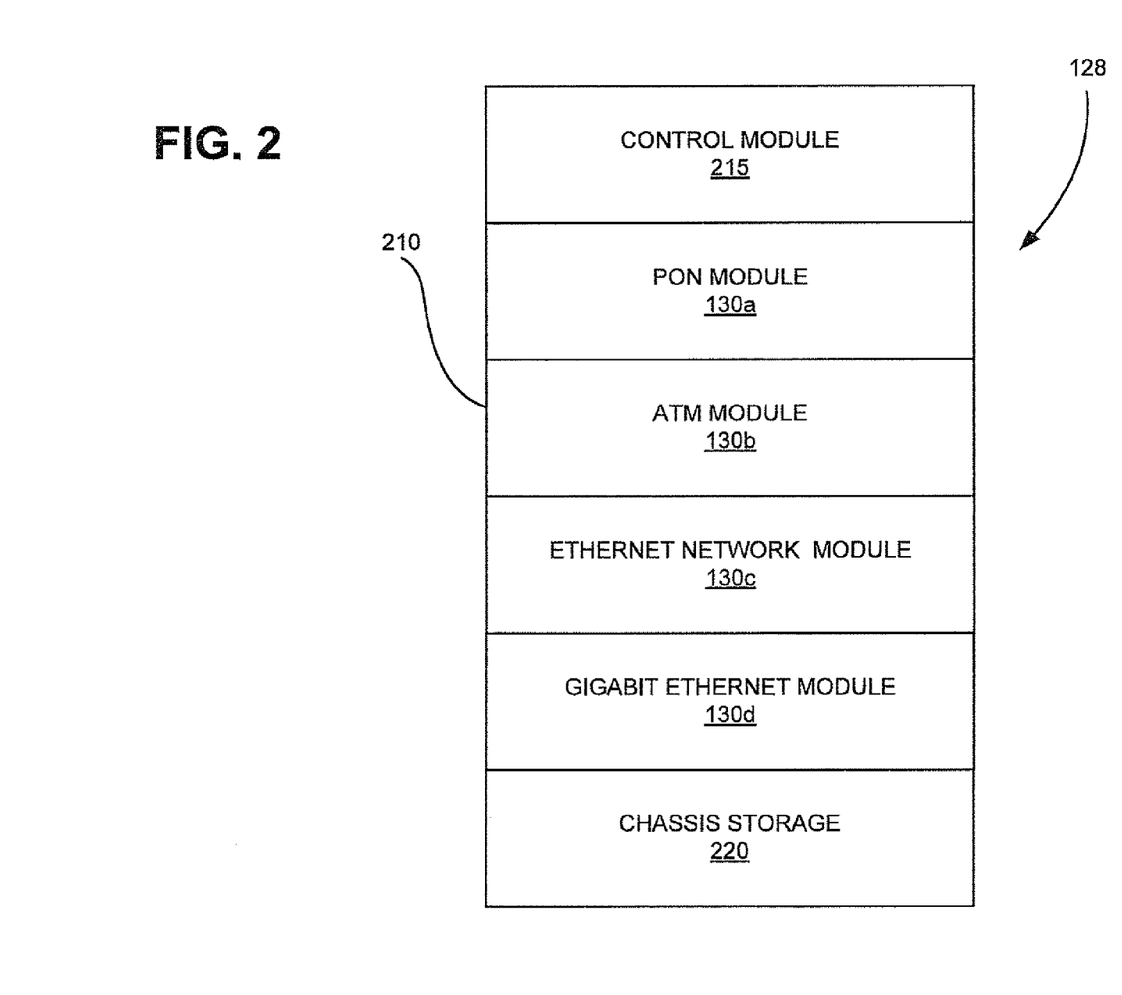
FIG. 2 is a diagram illustrating an exemplary implementation of a multi-module protocol analyzer configured to include the network modules of FIG. 1.

FIG. 2 is a diagram illustrating an exemplary implementation of a multi-module protocol analyzer 128 configured to include network modules 130a-130d, control module 215, and chassis storage 220. As illustrated, multi-module protocol analyzer 128 may include a chassis 210 configured to receive network modules 130a-130d having card or blade-type form factors.

Control module 215 may be configured to provide control access to each of modules 130a-130d using a common interface to control network 132. Additionally, control module 215 may be configured to provide protocol analysis functionality relating to each network module 130. For example, control module 215 may include software or hardware capable to receive and/or retrieve data captured at network modules 130 and provide analysis functionality relating to the data. In one exemplary implementation, control module 215 may include an operating system, such as a Linux operating system, executing software such as Pshark, Wireshark, Ethereal, Etherape, etc., for enabling viewing of data captured at various ones of network modules 130.

Chassis storage 220 may include a solid state (e.g., flash), magnetic, and/or optical recording medium and its corresponding drive for receiving and store capture data and/or analysis information from modules 130a-130d. Chassis storage 220 may be further configured to receive and store module configuration information from control module 215.

Because network data may be captured at a variety of locations in system 100, the data may be subsequently accurately correlated to identify problems in system 100 as they occur. For example, a user could easily retrieve data captured at both the OLT-PON interface (via network module 130a) and the OLT-Network 110 interface (via network module 130b). The user may then identify corresponding traffic based on matching sequence numbers associated with the data.

Figure 3:
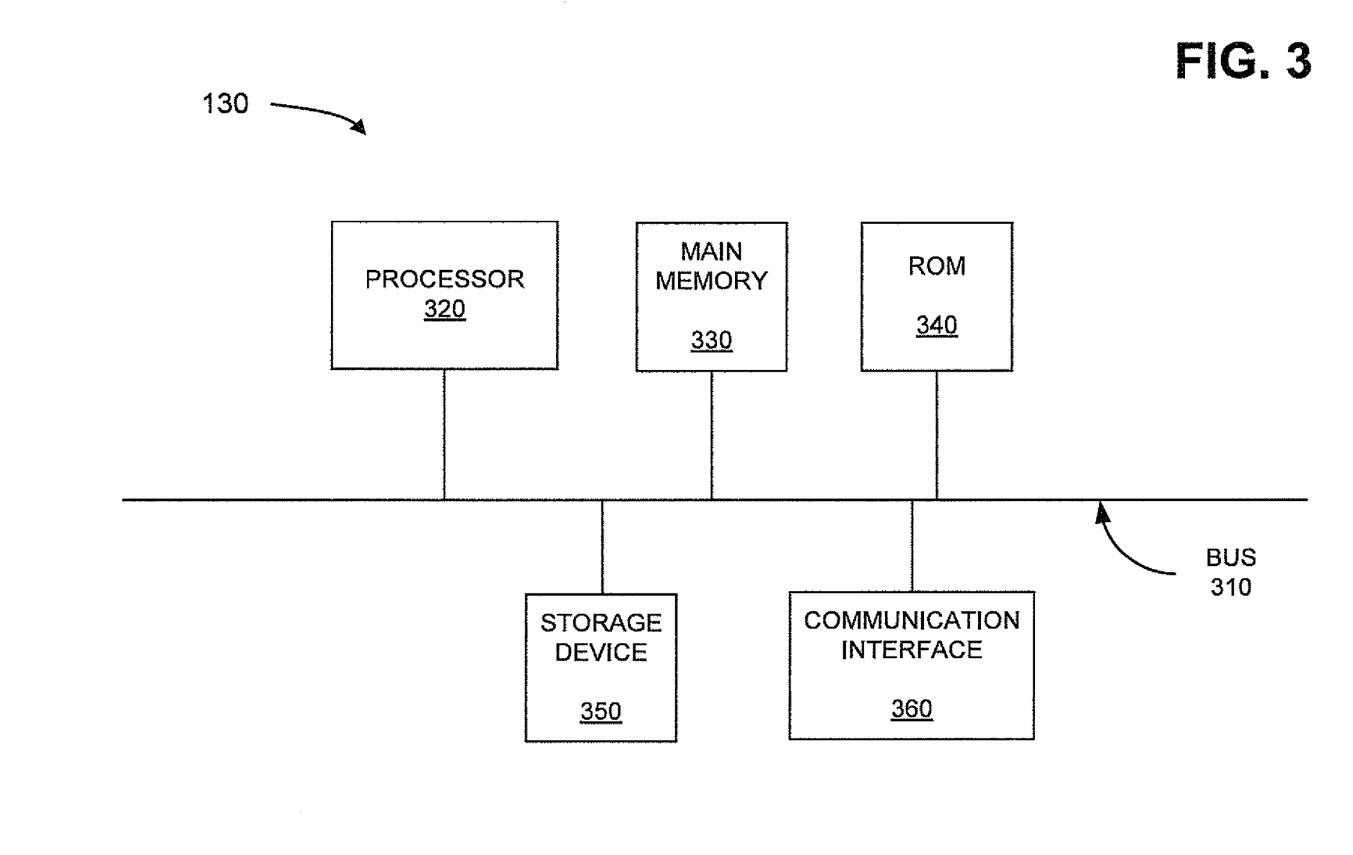
FIG. 3 is an exemplary diagram of one of the network module of FIG. 1.

FIG. 3 is an exemplary diagram of a network module 130, which may correspond to one or more of network modules 130a-130d discussed above in relation to FIG. 1. Network module 130 may include a bus 310, processor 320, main memory 330, read only memory (ROM) 340, storage device 350, and communication interface 360. Bus 310 may include a path that permits communication among the elements of network module 130.

Processor 320 may include a processor, microprocessor, or processing logic (e.g., an application-specific integrated circuit (ASIC), a field programmable gate array (FPGA), etc.) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a solid state (e.g., flash), magnetic, and/or optical recording medium and its corresponding drive.

Communication interface 360 may include one or more transceiver-like mechanisms that enable the network module 130 to communicate with other devices and/or systems. For example, communication interface 360 may include mechanisms for communicating with another device, such as OLT 116, edge router 112, voice gateway 118, SIP network 122, or control network 132. Additionally, communication interface 360 may include one or more sockets for facilitating connection with chassis 210 of multi-module protocol analyzer 128. Such sockets may facilitate powering of network module 130 using a power supply or communication interface(s) common to multi-module protocol analyzer 128.

As described briefly above, network modules 130 may perform certain network analysis-related operations. The network modules entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as storage device 350, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
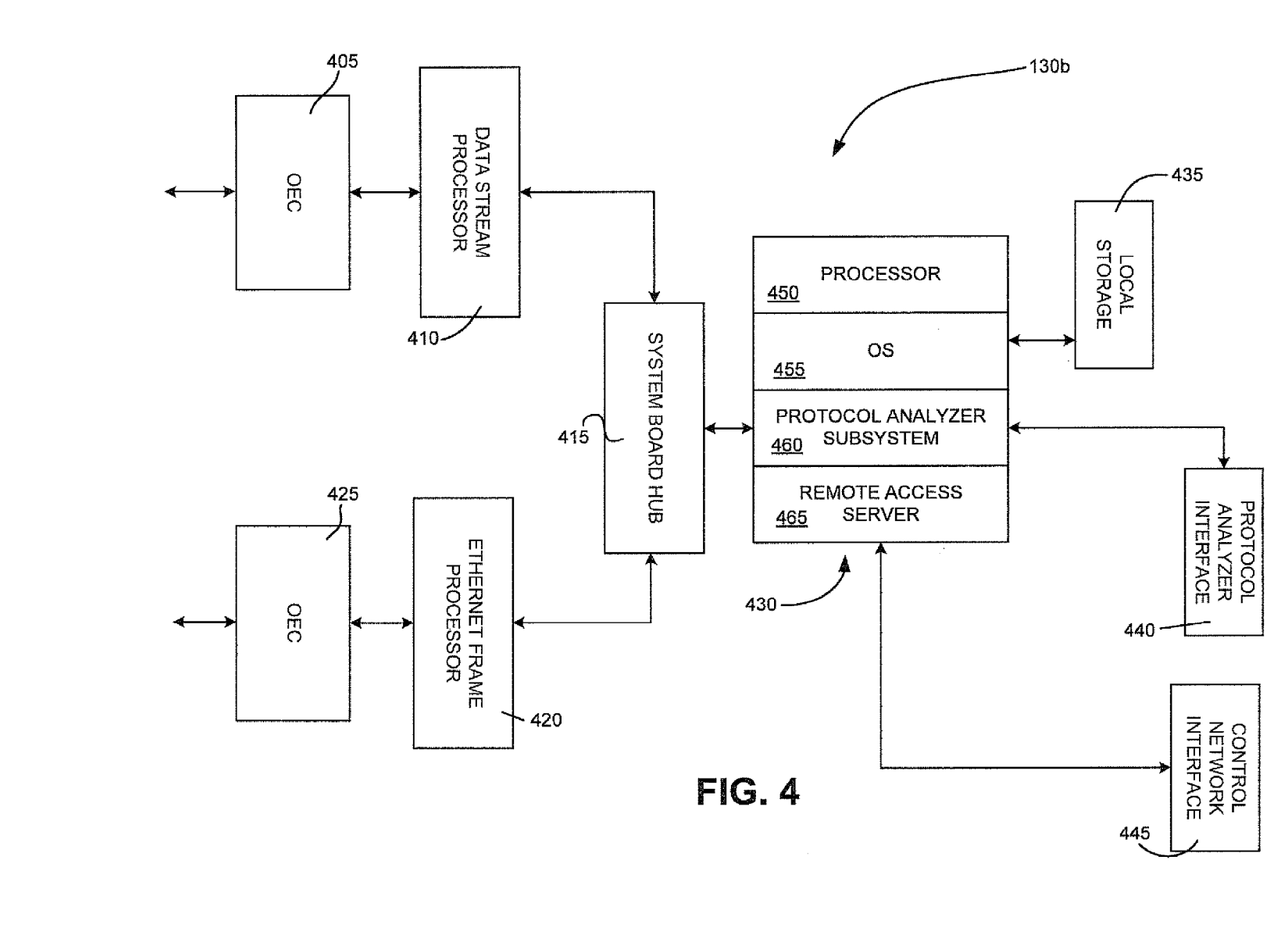
FIG. 4 is a functional block diagram of a network module of FIG. 1.

FIG. 4 is a functional block diagram of network module 130b illustrating one exemplary implementation. As illustrated, network module 130b may include network-side optical to electrical converter (OEC) 405, network-side data stream processor 410, system board hub 415, OLT-side data stream processor 420, OLT-side OEC 425, system board 430, local storage 435, protocol analyzer interface 440, and control network interface 445.

For purposes of brevity, the following description will be made assuming that data to be captured is traveling from network 110 to OLT 116. It should be understood that similar functionality may be provided for data traveling in a reverse path from OLT 116 toward network 110. Further, although the above-description relates to network module 130b, similar functionality may be found in modules 130a, 130c, and 130d.

Network-side OEC 405 may include a device capable of receiving an optical data stream from edge router 112 and converting the optical data stream into an electrical signal. Network-side data stream processor 410 may receive the electric signal from network-side OEC 405 and may convert the received electrical signal into a series of Ethernet frames or other suitable electrical data units. As discussed above, processor 410 may perform additional conversion operations resulting in other or additional data formats. Network-side data stream processor 410 may include any suitable processor, microprocessor, or processing logic (e.g., ASIC, FPGA, etc.) that may interpret and execute instructions. Although Ethernet frames are discussed above as the output of network-side data stream processor 410, it should be noted that any suitable data type or unit may be supported, such as ATM cells, ATM encapsulated Ethernet Frames, etc.

System board hub 415 may receive the converted Ethernet frames from network-side data stream processor 410 and deliver the frames out on two output interfaces, a first toward OLT-side data stream processor 420 and a second toward system board 430. In this manner, the Ethernet frames received from network-side data stream processor 410 are essentially duplicated and passed to each of OLT-side data stream processor 420 and system board 430.

OLT-side data stream processor 420 converts received Ethernet frames into electrical signals and forwards the signals to OLT-side OEC 425 for transmission to OLT 116. By providing system board hub 415, capture and analysis on traffic passing between edge router 112 and OLT 116 is performed with minimal impact on traffic speeds and latency.

Returning to system board 430, upon receipt of an Ethernet frame signal from system board hub 415, system board 430 operates to capture the received frames or packets. In one implementation, system board 430 includes system processor 450 executing operating system 455, protocol analyzer subsystem 460, and remote access server 465. System processor 450 may include any suitable processor, microprocessor, or processing logic (e.g., ASIC, FPGA, etc.) that may interpret and execute instructions. Operating system 455 may include any suitable operating system for supporting the execution of suitable data capturing and forwarding applications. In one implementation, operating system 455 may include a Linux operating system, such as the Busy-Box OS.

Protocol analyzer subsystem 460 may include software or hardware capable of capturing, analyzing, and transmitting data received by system board 430. In one implementation, protocol analyzer subsystem 460 may include software tools such as TCPDump, or TCP-CAP to capture received Ethernet frames and output the captured data in a time-stamped, text file format. In one implementation, the output files may include information captured in the headers or payload of each frame or packet received. This information may include protocol information, source and destination address information, source and destination port information, and sequence number information. The sequence number information relates to a unique value between sets of source and destination addresses that indicate a packet's position in a given flow session. This sequence number information enables a user/device to more completely synchronize and analyze the data at a later time. The output files may then be forwarded to local storage 435 or protocol analyzer interface 440 for subsequent review and analysis. In one implementation, local storage 435 may include locally maintained memory device for receiving and storing subsets of globally captured data and/or for providing redundant backup for cases of data loss.

In one implementation, protocol analyzer interface 440 may provide a connection between network module 130b and control module 215. In other implementations, protocol analyzer interface 440 may provide a connection between network module 130b and a remote analysis device (not shown) for storage and analysis. In these implementations, users of the remote analysis device may retrieve and analyze network data from a variety of distributed network modules. Exemplary users may include field technicians, operations personnel, lab technicians needing to make checks on data streams, and testers who have to use protocol analysis data.

Remote access server 465 may include software or hardware capable of receiving control commands from control network interface 445. In one implementation, control network interface 445 may be configured to connect network module 130b with control network 132 via control network access module 215. For example, remote access server 465 may include an SSH (secure shell) server configured to enable users to log into network module 130b from control network 132 and modify settings, etc. for network module 130. In one implementation, such settings may include commands to initiate data capture, perform a local storage of a potion of the capture data, configuration settings for network-side and OLT-side data stream processors 415 and 420, etc. Exemplary configuration settings for network-side and OLT-side data stream processors 415 and 420 may include collection and transmission of processor and performance monitoring statistics, alarm settings relating to processors 415 and 420, etc. The alarm settings may instruct processors 415 and 420 to generate alarms and/or notifications via remote access server 465 in the event that either processor 415 or 420 fails to receive data expected streams from OECs 410 and 430.

In one implementation, network data captured by network modules 130 may be maintained in a database, such as a SQL or MySQL database. In such an implementation, captured data may be subsequently made available to a web server for efficient review.

It should be noted that any type of data may be captured and analyzed. For example, real time protocol (RTP) data may be captured and reviewed at various locations associated with a service provided. Using a number of network modules 130, the RTP data for a specific session (e.g., a voice over IP call), the quality of the session may be dynamically monitored. Such a multi-location analysis may provide for real time adjustments to the session that dynamically improve a caller's experience.

Figure 5:
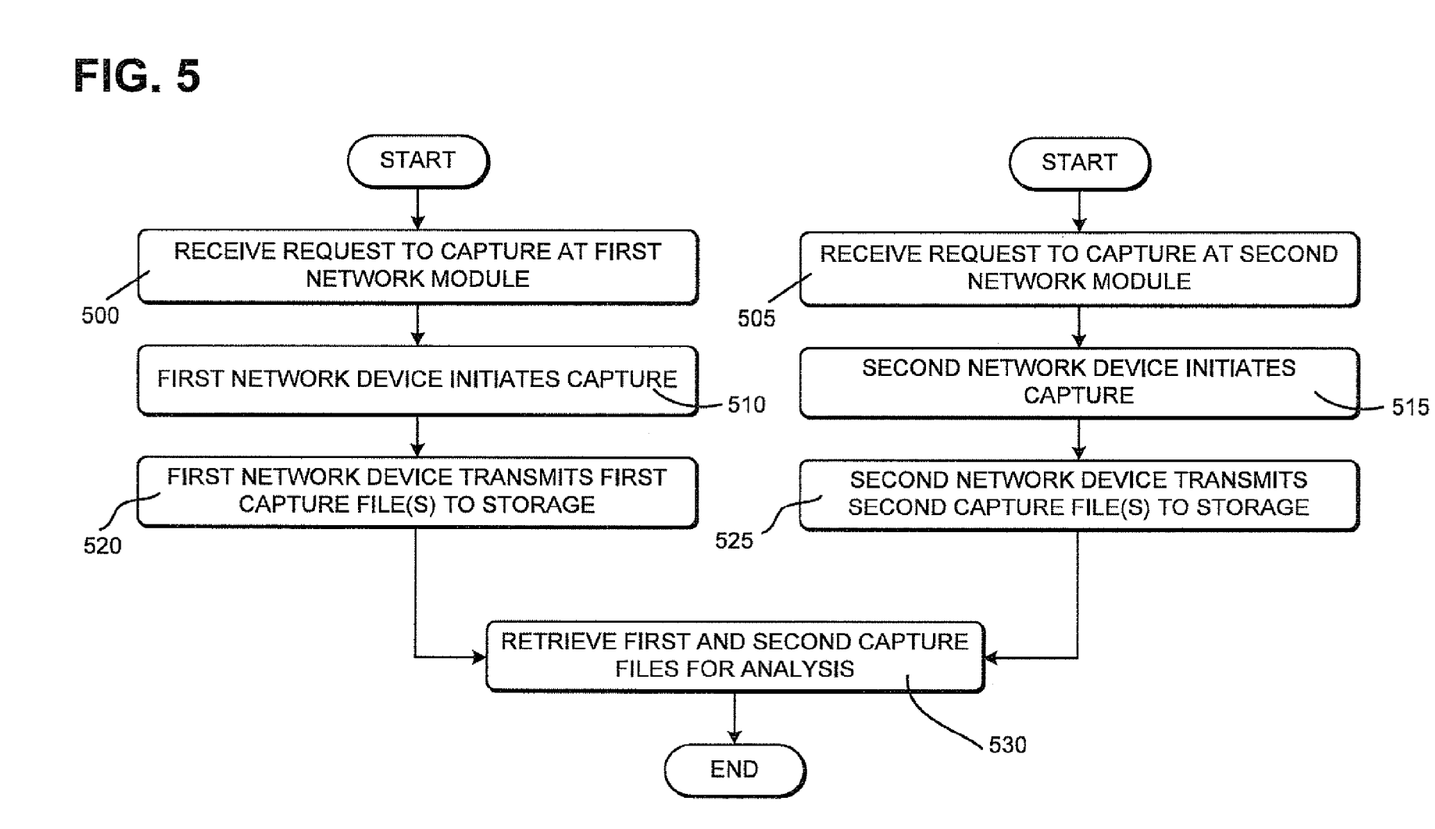
FIG. 5 is a flow chart of an exemplary process of enabling data analysis at multiple interfaces, consistent with exemplary embodiments.

FIG. 5 is a flow chart of an exemplary process of enabling data analysis at multiple interfaces, consistent with exemplary embodiments. In one embodiment, the processing of FIG. 5 may be performed by one or more components within multi-module protocol analyzer 128. In another embodiment, some or all of the processing described below may be performed by another component or group of components including or excluding components within system 100.

Processing may begin with network modules 130a receiving a user command to begin data capture (block 500). Similarly, network module 130c may also receive a command to begin data capture (block 505). In one implementation, the commands to begin data capture may be received directly from a user or users via control network 132 and remote access servers 465 on modules 130a and 130c. In another implementation, the data capture commands may be received via control module 215 on multi-module protocol analyzer 128. It should be understood that a suitable data capture command may be received either directly or indirectly and may result from additional commands directed toward control module 215 or another network management or testing device (not shown). Further, it should be noted that the commands to initiate data capture may further designate a type of data or traffic to be captured. In one exemplary implementation, such designations may be made using command flags or options, or using filters or Boolean expressions.

Upon receipt of the data capture commands, network modules 130a and 130c each initiate capture of data at their respective protocol analyzer subsystems 460 (blocks 510 and 515, respectively). As described above, in one exemplary implementation, this process may include execution of a packet capturing application by packet analyzer subsystems 460. Network module 130a may transmit one or more data capture files to a storage device (block 520). Similarly, network module 130c may transmit one or more data capture files to the storage device (block 525). As described above, captured data may be forwarded to various locations for subsequent analysis or review. In one implementation, the captured data files may be forwarded to chassis storage 220. Alternatively, the captured data files may be forwarded to a storage location remote from multi-module protocol analyzer 128. In yet another implementation, the captured data files may be forwarded to local storage 435 associated with the respective network module 130.

Regardless of where the captured data files are stored, each element of data (e.g., each packet) referenced in each data file may be associated with the network module or interface from which it was received and a timestamp indicating the time in which it was captured. Moreover, as described above, each data file may include information included within the header and/or payload of the captured packet.

Once forwarded and stored, the data captured from each of network modules 103a and 103c may be retrieved for analysis (block 530). In one implementation, such retrieval may be performed by a protocol analysis application executing on control module 215. Alternatively, the retrieval may be performed by a remote device or application having access to the stored data. Because each data file includes information designating the flow and sequence information for each captured data unit (e.g., each frame or packet), data obtained at multiple points within system 100 may be easily and accurately synchronized and correlated to provide for enhanced analysis. For example, sequence numbers relating to data captured at multiple points within system 100 may be used to synchronize the data captures in real-time or later, thereby providing a system-wide view of data as it travels through system 100.

Conclusion

Implementations described herein enable efficient and coordinated analysis of a data network at multiple interfaces. More specifically, a multi-module protocol analyzer may be configured to include network modules corresponding to various locations in a network. Each network module may be configured to capture network data and forward the network data for subsequent analysis in either real-time or at a later time. The data captured at multiple locations may then be synchronized or correlated to facilitate problem identification and analysis.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of acts has been described above with respect to FIG. 5, the order of the acts may differ in other implementations. Moreover, non-dependent acts may be performed in parallel.

It will be apparent that features of the invention, as described above, may be implemented in many different forms of software, firmware, and hardware in the implementations illustrated in the figures. The actual software code or specialized control hardware used to implement the invention is not limiting of the invention. Thus, the operation and behavior of the aspects of the invention were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A device, comprising:
 a first module to capture information relating to network traffic passing through a first interface in a network device;

a second module to capture information relating to network traffic passing through a second interface in the network device, wherein the first interface is associated with a first network protocol and the second interface is associated with a second network protocol different than the first network protocol; and a control module configured to:

transmit control commands to the first module and the second module, the control commands instructing the first module and the second module to capture information relating to network traffic passing through the first interface and the second interface, respectively;

receive the captured information from the first module and the second module;

correlate the received information from the first module and the second module based on sequence number information included in the captured information from the first module and the second module; and provide the correlated information to a user.

2. The device of claim 1, wherein the information relating to network traffic comprises source information and destination information.

3. The device of claim 1, wherein the control module is further configured to synchronize the received information from the first module and the second module based on the sequence number information.

4. The device of claim 1, wherein the information relating to network traffic comprises packet header information and timestamp information.

5. The device of claim 1, wherein the network device comprises an optical line terminal (OLT) unit and wherein the first interface comprises an Internet protocol (IP) network interface in the OLT unit, a session initiation protocol (SIP) interface in the OLT unit, a public switched telephone network (PSTN) in the OLT unit, or a passive optical network (PON) interface in the OLT unit.

6. The device of claim 1, wherein the captured information from the first module and the second module comprises text-based information.

7. The device of claim 6, wherein the control module is further configured to store the captured information in a database.

8. A device, comprising:

a first module to capture information relating to network traffic passing through a first interface in a network device;

a second module to capture information relating to network traffic passing through a second interface in the network device, wherein each of the first module and the second module comprises a system board hub for duplicating received network traffic to generate a first output signal and a second output signal;

wherein the first module is further configured to:

capture the information relating to network traffic responsive to a received control command from the first output signal; and forward the second output signal to a downstream component, wherein the first interface is associated with a first network protocol and the second interface is associated with a second network protocol different than the first network protocol; and a control module configured to:

transmit control commands to the first module and the second module, the control commands instructing the first module and the second module to capture information relating to network traffic passing through the first interface and the second interface, respectively;

receive the captured information from the first module and the second module;

correlate the received information from the first module and the second module; and provide the correlated information to a user.

9. The device of claim 8, wherein each of the first and second modules comprises:

a first optical to electrical converter to convert optical signals received at the first and second interfaces, respectively, into electrical data units, wherein the system board is configured to capture the electrical data units from the first optical to electrical converter and transmit the captured electrical data units to a storage location via the first output signal.

10. The device of claim 8, wherein the system board further comprises a remote access server to receive the control commands from the control module.

11. The device of claim 8 wherein the electrical data units comprise one of Ethernet frames, Ethernet packets, or Asynchronous Transfer Mode cells.

12. A computing-device implemented method, comprising:

receiving first network traffic at a first module associated with a first interface in a network device;

receiving second network traffic at a second module to capture information relating to network traffic passing through a second interface in the network device;

transmitting control commands to the first module and the second module, the control commands instructing the first module and the second module to capture information relating to first and second network traffic passing through the first interface and the second interface, respectively;

receiving the captured information from the first module and the second module;

storing the receiving information;

retrieving the stored information for analysis; and correlating the stored information from the first module and the second module based on sequence number information included in the captured information from the first module and the second module.

13. The computing-device implemented method of claim 12, wherein the first interface is associated with a first network protocol and the second interface is associated with a second network protocol different than the first network protocol.

14. The computing-device implemented method of claim 12, wherein the information relating to the first and second network traffic comprises source information and destination information associated with the first and second network traffic.

15. The computing-device implemented method of claim 12, wherein the stored information comprises text-based information.

16. A computing-device implemented method, comprising:

receiving first network traffic at a first module associated with a first interface in a network device;

receiving second network traffic at a second module associated with a second interface in the network device, wherein each of the first module and the second module comprise a system board hub for duplicating the received network traffic to generate a first output signal and a second output signal;

transmitting control commands to the first module and the second module, the control commands instructing the first module and the second module to capture information relating to first and second network traffic passing through the first interface and the second interface, respectively;

capturing the information relating to the first and second network traffic from the first output signal responsive to the received control command;

forwarding, by the system board hub, the second output signal to a downstream component;

receiving the captured information from the first module and the second module;

storing the receiving information; and retrieving the stored information for analysis.

17. A system, comprising:

a control module to transmit instructions for capturing network traffic information;

a first interface module associated with a first network interface, the first interface module comprising:

logic to receive first control commands from the control module, the first control commands instructing the first interface module to capture first information relating to first network traffic passing through the first network interface;

logic to capture the first information responsive to the first control commands; and logic to transmit the first captured information to the control module;

a second interface module associated with a second network interface, the second interface module comprising:

logic to receive second control commands from the control module, the second control commands instructing the second interface module to capture second information relating to second network traffic passing through the second network interface;

logic to capture second information associated with the second network traffic responsive to the second control commands; and logic to transmit the second captured information to the control module, wherein the control module further comprises:

logic to receive the first and second captured information; and logic to correlate the received information for analysis by a user based on sequence number information included in the captured first and second information.

* * * * *